(12) United States Patent
Crowley et al.

(10) Patent No.: US 7,743,396 B2
(45) Date of Patent: Jun. 22, 2010

(54) MEDIA STREAMING ENHANCEMENTS (75) Inventors: Matthew W. Crowley, Los Altos, CA (US); Jeffrey A. Finkelstein, San Francisco, CA (US); Sachin S. Kansal, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 646 days.

(21) Appl. No.: 11/316,585

(22) Filed: Dec. 21, 2005

(65) Prior Publication Data
US 2007/0094705 A1    Apr. 26, 2007

Related U.S. Application Data (60) Provisional application No. 60/730,447, filed on Oct. 25, 2005.

(51) Int. Cl.
    *H04N 7/16*      (2006.01)
    *G06F 3/00*      (2006.01)
    *H04N 7/173*      (2006.01)
    *H04M 11/04*      (2006.01)

(52) U.S. Cl. ................... 725/46; 725/136; 725/110; 455/404.2

(58) Field of Classification Search ................ 725/136, 725/46
See application file for complete search history.

(56) References Cited

U.S. PATENT DOCUMENTS 6,944,447 B2 * 9/2005 Portman et al. .......... 455/422.1
2003/0093790 A1 * 5/2003 Logan et al. ................ 725/38
2004/0226043 A1 * 11/2004 Mettu et al. ................ 725/46
2005/0160457 A1     7/2005 Rui et al.
2005/0165739 A1 * 7/2005 Yamamoto et al. .......... 707/3
2005/0182792 A1 * 8/2005 Israel et al. ............. 707/104.1
2006/0159117 A1 * 7/2006 Furlong et al. ............ 370/432
2006/0212906 A1 * 9/2006 Cantalini .................. 725/62
2006/0282408 A1 * 12/2006 Wisely et al. ............... 707/3

OTHER PUBLICATIONS

Bickers, J., "How DVRs Work," HowStuffWorks, Inc., 1998-2005, [online] [Retrieved on Oct. 17, 2005] Retrieved from the Internet<URL:http://electronics.howstuffworks.com/dvr.htm/printable>.

Creutzburg, R., "Media Reviews: Interactive Television," IEEE Computer Society, 2005, pp. 88-89.

(Continued)

*Primary Examiner*—Lester Kincaid
*Assistant Examiner*—Yu (Andy) Gu
(74) *Attorney, Agent, or Firm*—Fenwick & West LLP (57) ABSTRACT A system and a method are disclosed for configuring a device for receipt of data corresponding to broadcast media signal. The system and method include selecting a metadata preference for use in a search of metadata associated with the broadcast media signals and selecting a notification preference for a notification format. The selected metadata preference and the selected notification preference are transmitted to a hosting system. The device can then receive, in the selected notification format, data corresponding to a broadcast media signal, the broadcast signal corresponding to the metadata preference. In one embodiment, the broadcast media signal is an analog or digital video signal. The metadata can be in a non-video portion of the broadcast television signal, for example, a vertical blanking interval or header field.

20 Claims, 5 Drawing Sheets

---

JANE'S PERSONALIZED MEDIA SERVICES PAGE

YOUR SEARCH REQUEST FOR "WORLD SERIES GAME 7" HAS BEEN MET WITH A VIDEO FEED AVAILABLE AT www.mobiletvstations.com LOCATION BASES SERVICES AVAILABLE:
From your location - "World Series Game 7" can be seen at:

1. <u>Da' Grill</u>, 123 3rd Avenue, San Francisco, CA, 94555
2. <u>Parimeer Sports Bar</u>, 4567 Market Street, San Francisco, CA 94555
3. <u>Nice View Café</u>, 89 Howard Street, San Francisco, CA 94555

CLICK ON A NAME OR SELECT NUMBER FOR MORE INFORMATION

OTHER PUBLICATIONS

"Emmy® Award Winning MobiTV Unveils MobiTV2® and MobiRadio™," MobiTV, Inc., Sep. 26, 2005, [online] [Retrieved on Oct. 6, 2005] Retrieved from the Internet<URL:http://www.mobitv.com/about/company/press/release_092605.html>.

"MobiEnabled Developers Program," Idetic, Inc., 2 pages.

Palma, P. et al., "The Virtual Image in Streaming Video Indexing," Proc. Int. Conf. on Dublin Core and Metadata for e-Communities, 2002, pp. 97-103.

Schroeter, R. et al., "FilmEd—Collaborative Video Indexing, Annotation and Discussion Tools Over Broadband Networks," Multimedia Modelling Conference, 2004, Proceedings, 10$^{th}$ International, Jan. 5-7, 2004, pp. 346-353.

"Standard for Carriage of NTSC VBI Data in Cable Digital Transport Streams," Engineering Committee, Digital Video Subcommittee, Society of Cable Telecommunications Engineers, 2001, pp. 1-21.

Steijaert, A. et al., "SURFnet Video Portal: The Next Generation of Streaming Video for Research and Higher Education," TERENA Networking Conference 2003 with the CARNet Users' Conference 2003, 5 pages.

Vedro, S., "Why Metadata Matters: It Greases Digital Wheels," Current Online, Sep. 10, 2001, [online] Retrieved from the Internet<URL:http://www.current.org/dtv/dtv0116meta.html>.

Worthington, T., "Metadata: the 'Killer application' for Digital Broadcasting?" Mar. 2002, [online] Retrieved from the Internet<URL:http://www.tomw.net.au/2002/mka.html>.

\* cited by examiner

MEDIA STREAMING ENHANCEMENTS

CROSS REFERENCE TO RELATED APPLICATIONS

This application claims a benefit of, and priority under 35 USC §119(e) to, U.S. Provisional Patent Application No. 60/730,447, filed Oct. 25, 2005, and titled "Media Streaming Enhancements", the contents of which are herein incorporated by reference

BACKGROUND

1. Field of Art

The present invention generally relates to the field of media streaming, and more specifically, to media streaming enhancements which include metadata.

2. Description of the Related Art

The vertical blanking interval (or VBI) is used in nearly all televisions and computer monitors, which require a small amount of time for the scanning circuitry to return to the top of the screen after completing scanning of the last line at the bottom. Video signal standards recognize this fact by inserting a number of "blank" lines at the beginning of each new picture. These blank lines make up the "vertical blanking interval".

Over time, the vertical blanking interval has been a useful mechanism for transmission of data sent along with transmitted video. For example, closed captioning information is inserted into the VBI. In conventional analog television signals, closed captioning are subtitles for the hearing impaired individuals and environments that are transmitted as digital data within the VBI. Specifically, text corresponding to spoken word is typed out on the screen as voice is spoken or sound is made relative to the video displayed. Closed captioning is sometimes is referred to as "line 21 captioning" because the data is carried in line 21 of the VBI. As digital television standards are emerging, e.g., high-definition television (HDTV), closed captioning continues to remain. Newer standards for transmitting such information include EI-708 along with line 21 captioning.

More recently, in addition to closed captioning, the non-viewable VBI is being used to carry other information. For example, Internet designers are now using it to transmit unidirectional digital information from Web sites to Web clients. The model for sending information over VBI is often called "data broadcasting". The technique is a one-way transmission from the station to users, just like television. Stations broadcast popular information such as stock quotes, sports news, and the like.

Unlike conventional Internet connected systems, users in the data broadcasting configuration did not interact with a Web server. Nevertheless, the technique is useful for delivering specific content, particularly in bulk transmission applications. For example, rather than to each subscriber individually over the Internet, the information is broadcast at periodic intervals to a special browser, which shows the latest updates. Users could choose to tune into the broadcast and select only the news items of interest to them.

In addition, standards such as RFC 2728 (Transmission of IP over Vertical Blanking Interval of a Television Signal, November 1999) describe a method for broadcasting Internet protocol (IP) data using the VBI. This standards proposal included a description for compressing IP headers on unidirectional networks, a framing protocol identical to SLIP, a forward error-correction scheme, and the NABTS (North American Basic Teletext Standard) byte structures.

While standards for broadcasting data over the VBI have evolved, they continue to have limited applicability for users as noted above. For example, closed captioning and other push type data (e.g., stock quotes, weather, etc.) are structured for mass audiences. They are not customizable at level specific to the user. Hence, the user fails to attain personalization that, if available, may allow for a richer experience relative to the video transmission. Further, there is no return loop from the user back to a server associated with the VBI data broadcast to provide the user with a mechanism for customization or instructions for furtherance of their experience.

While television signals today are primarily of a broadcast variety, there is migration to streaming video of television signals. Streaming includes a technique to transfer data so that it can be processed as a steady and continuous stream. Streaming technologies are becoming increasingly important with the proliferation of the Internet because most users do not have fast enough access to download large multimedia files quickly. With streaming, the client browser or plug-in can start displaying the data before the entire file has been transmitted.

With regard to the Internet, streaming involves sending video from a server to a client over a network in packets. At the receiving end, the packets are reassembled to play the video as it arrives. The video file is never actually downloaded since the packets are discarded after they have been decoded and viewed. Because the timing of packet arrival is so important, streaming servers use the Realtime Transport Protocol (RTP) instead of the hypertext transfer protocol (HTTP) typically used for communicating web content.

Streaming video offers an opportunity to include general video metadata, but the size and format of this video metadata requires specialized players such as Windows Media Player from Microsoft Corporation®, RealMedia Player from Real Networks®, or QuickTime from Apple Computer, Inc.®. However, these media systems do not offer opportunities for further customization as to how the user can interact with the broadcast signal, hence, once more limiting the user's overall experience with the media environment.

The need for personalization of user experiences is further compounded by the proliferation of portable electronic devices such as personal digital assistants (PDAs), mobile phones, smart phones, gaming devices, media devices, and the like. These devices offer opportunities for personalization, but none offer mechanisms or processes for customization relative to broadcasts of video signals.

Therefore, there is a need for a system and method for customizing media experiences for users, particularly on portable devices, relative to transmissions of media, for example, from broadcast systems.

SUMMARY

One embodiment of the present invention includes a system and a method for receipt of data corresponding to broadcast media signal. The system and method include selecting a metadata preference (or condition) for use in a search of metadata associated with the broadcast media signals and selecting a notification preference for a notification format. The selected metadata preference and the selected notification preference are transmitted to a hosting system. The device can then receive, in the selected notification format, data corresponding to a broadcast media signal, the broadcast signal corresponding to the metadata preference. In one embodiment, the broadcast media signal is an analog or digital video signal. The metadata can be in a non-video portion of the broadcast television signal, for example, a vertical blanking interval or header field.

By way of example, one embodiment of the present invention is configured with respect to interaction between a broadcaster, a headend, and a user. In one embodiment, the user interacts with the headend through a mobile communication device, e.g., a mobile telephony device. The broadcaster transmits to the headend, and the headend stores, (long term or temporary) broadcast media signals (or feeds), e.g., television signals, with associated metadata. The headend also stores mobile telephony device user information and preferences associated that mobile telephony device.

The headend uses one or more preferences (e.g., search term) for comparison with the metadata of the broadcast media signal. If a comparison threshold is met, a notification is transmitted to the mobile communication device in a notification format (e.g., electronic mail (email), short message service (SMS), multimedia message service (MMS), etc.) specified by other preference information associated with the mobile communication device.

The mobile communication device is configured to allow a user to enter in other preferences (or conditions) that also are stored at the headend. For example, in addition to preferences such as search terms, keywords, etc., the preferences stored can include timing data, e.g., frequency of updates, notification format preferences and the like. Once the notification is received the mobile device is configured to allow enablement of additional services, e.g., location based services, based in part on the data associated with the notification.

The system and method disclosed include a number of benefits and advantages. One advantage is customization of broadcast information relative to a mobile communication device. Another advantage is follow-on features and services that flow through from a customization of process initiated through the mobile communication device.

The principles disclosed herein also can be applied to non-streaming technology, for example, in the case of analog and digital broadcast to portable devices. For example, if a keyword was found in metadata, then in a digital video broadcast (DVB-H) example, the channel would change locally on the device. Likewise the principles disclosed herein can be incorporated into other video technologies, for example, Media-FLO™ by QUALCOMM Incorporated.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a system and a method for enhancing a media experience for a user. In one embodiment, the media includes a broadcast media signal. An example of a broadcast media signal is a television signal. The television signal can be either analog or digital.

Figure 9:
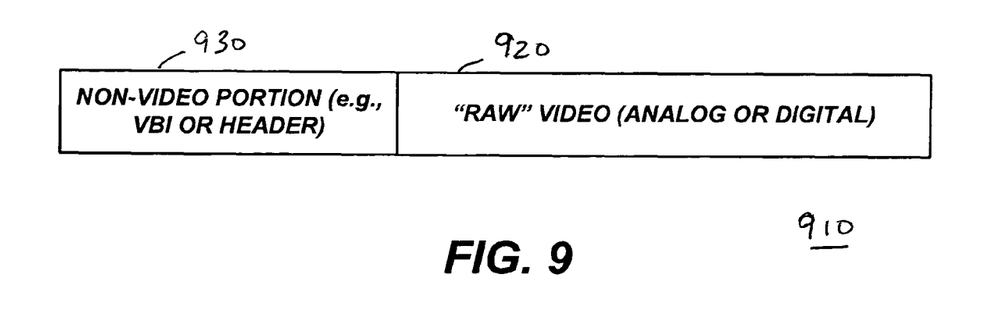
FIG. 9 illustrates one example of a broadcast video signal comprising "raw" video and a non-video portion.

An example of a television signal 910 logical format is illustrated in FIG. 9. The television signal includes a "raw" video portion 920 and a non-video portion 930. The raw video portion comprises the signals of images themselves. The non-video portion comprises the part of the television signal that can carry data, for example, a vertical blanking internal (VBI) in analog television signals or a header (or VBI equivalent) in digital television signals. The non-video portion may be configured to carry data (e.g., metadata) that is associated with the television signal.

It is noted that for ease of discussion and understanding, the description that follows is provided in a context of broadcast television signals, but can be applied to other broadcast media that in which a portion of the broadcast signal includes space for metadata. The broadcast signal has the characteristic of transmission made available to relative masses, each of which receives the same information provided they have the appropriate equipment and/or authorization to access the signal. In addition to television signals, examples of such broadcast signals include AM or FM radio, satellite radio, and Internet streaming video.

An Architectural Overview

Figure 1:
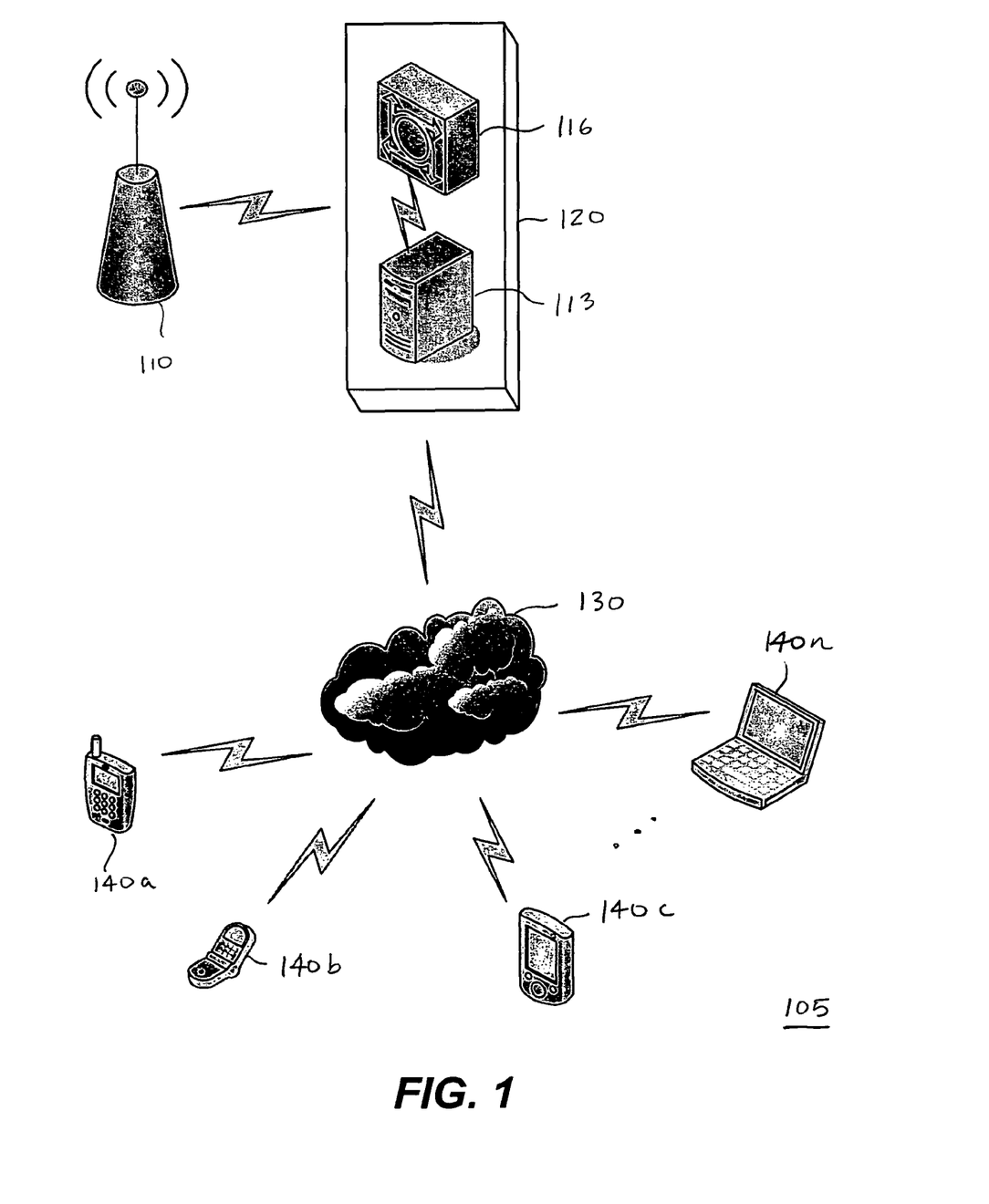
FIG. 1 illustrates a communications system in accordance with one embodiment of the present invention.

FIG. 1 illustrates a communications system 105 in accordance with one embodiment of the present invention. The communications system 105 includes a broadcast transmission system 110, a communications headend 120, and one or more bi-directional communication devices 140a-n (generally 140). The broadcast transmission system 110 is communicatively couples the communication headend 120. The communication headend 120 communicatively couples the one or more bi-directional communication devices 140. In some embodiments, a portion or all communications between the communication headend 120 and the bi-directional communication device 140 may be through a network, for example, the Internet.

The broadcast transmission system 110 includes a broadcast media supplier, e.g., a television or radio station, which transmits broadcast media signals through mechanisms such as media transmission towers, cable, and satellite. In one embodiment, supplied broadcast media signals also incorporate metadata into the signal, for example, in the case of television signals the metadata may be in the non-video portion 930 of the television signal 910. In is noted that the metadata may be supplied by the broadcast transmission system 110 entity itself or from third-parties. A portion of the broadcast media signal that is set aside for metadata may be accessed through a programming interface to allow for entering in of the appropriate metadata for broadcast transmission with the media signal.

The communications headend 120 includes a hosting system 113 and a communication routing system 116. The communications headend 120 receives broadcast signals from the broadcast transmission system 110 and stores them in the hosting system 113 for distribution through the communication routing system 116. It is noted that television type broadcast signals can be transmitted to the bi-directional communication devices 140 through services such as MobiTV® from MobiTV, Inc. (Emeryville, Calif.).

The one or more bi-directional communication devices 140 is a device that is configured to communicate with the communications headend 120 and based on that communication receive the broadcast media signals from the communications headend 120. In some preferred embodiments, the bidirectional communication device 140 is a mobile computing device configured for wireless communications. For example, the mobile computing device can be a cellular telephone (or other mobile telephone, including PCS, mobile VoIP, etc.) telephone or smart phone configured to communicate through a cellular communication protocol, e.g., global system for mobile communication (GSM) or code division multiple access (CDMA). The mobile computing device also can be configured for wireless data communications through a wireless data communicating protocol, e.g., IEEE 802.11, 802.16, or general packet radio service (GPRS). The wireless data communication can be configured to provide voice communications, e.g, through voice over Internet protocol (VoIP). It is noted that the bidirectional communication device is configured to include appropriate computer and communication architecture, for example, processor, memory, storage, and communications subsystems (e.g., chipsets, etc.). In one embodiment, the mobile computing device may be configured to be a handheld computing device that is structured as a compact device, for example, so that it can be held in a user hand and optionally can also be operated by the same user hand.

Host System Architecture

Figure 2:
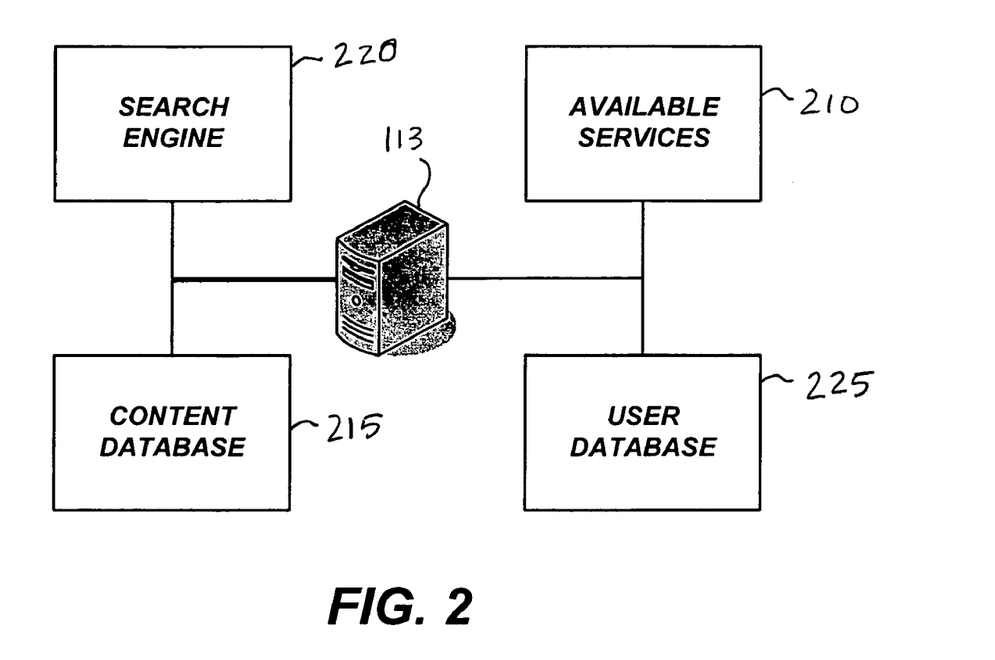
FIG. 2 illustrates a host system configuration in accordance with one embodiment of the present invention.

FIG. 2 illustrates a configuration for the host system 113 in the communications headend 120 in accordance with one embodiment of the present invention. The host system is configured to include one or more computing systems (e.g., mainframe, rack servers, personal computing server systems, etc.) with appropriate related hardware and software, for example, an operating system and program code configured to execute functionality for the services as described herein.

The host system 113 includes available service applications 210, a content database 215, a search engine 220, and a user database 225. The available services 210 include applications of interest to users of the bidirectional communication devices 140. Examples of such applications include location based services, rich site summary (RSS) feeds, media feeds (e.g., video, still picture and/or audio), world wide web (www) access, communication services (e.g,. phone, e-mail, messaging), and other services of interest. It is noted that the available services 210 also may be configured to communicate with a billing system (not shown) so that charges may be applied for accessed services where appropriate. Further, the billing system can be configured in a variety of options, for example, flat rate, per transaction, incorporation with an existing service (e.g., cellular service provider), or the like.

The content database 215 includes appropriate storage and database software to receive, store and catalog the broadcast media signal received from the broadcast transmission system 10. The storage of the media signal in the content database 215 may include separate storage of the metadata for use by the available services 210 or other systems (e.g., a billing system configured to identify billing codes in the metadata of the media system). The search engine 220 is configured for search related services related to the metadata captured from the broadcast media signals and stored in the content database 215.

The user database 225 is configured to store information associated with (or relating to) users of services of the communication system 105. For example, in a subscription model, a user of services in the communication system 105 would have a bi-directional communication device 140 configured for phone and data communication, e.g., through a cellular service provider such as Cingular, Verizon, T-Mobile, Virgin Mobile, or Orange. The user could thereafter register the device in the user database 225 to provide services from the available services 210. In the user database 225, the registration of the user can be through any mechanism that allows for unique identification, for example, the user telephone number, an e-mail address, a messenger address, a serial number associated with a phone or subscriber identify module (SIM), or a medium access control (MAC) address. Associated with the unique identification are services from the available services 210 that the user requests.

Client System Architecture

Figure 3:
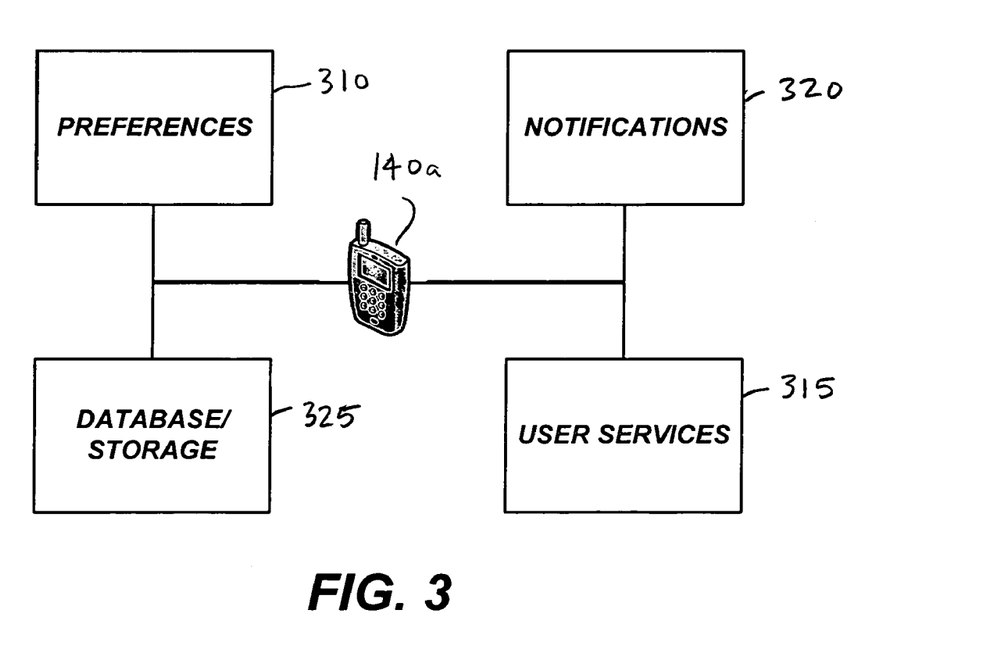
FIG. 3 illustrates a client system configuration in accordance with one embodiment of the present invention.

FIG. 3 illustrates a client system configuration in accordance with one embodiment of the present invention. The client system includes a conventional processor, memory, and optional storage, along with appropriate software, for example, operating system and program code to execute functionality for executing applications and for providing services as described herein. In the illustrated embodiment, the client system is configured as a bi-directional communication device 140. The bi-directional communication device 140 includes a preferences 310 configuration tool, user services 315 tool, a notifications tool 320, and a database and appropriate storage mechanism 325.

By way of example, and for ease of discussion, the client system will be described through a smart phone 140a, although the principles disclosed herein are applicable to other bi-directional communication devices 140b-n. In one embodiment the smart phone 140a is configured for cellular communications services through a cellular service provider.

The smart phone 140a also is configured, through the user services 315 tool, to request, receive and play broadcast media, for example, broadcast television signals, from the communications headend 120 (e.g., the hosting system 113). Through the preferences 310 tool the user can identify metadata preferences that can be used by the communications headend 120 (to forward appropriate broadcast signals to the user's smart phone 140a. Through the notification 320 tool the user can configure how information is to be received by the smart phone 140a as it relates to the broadcast media to be received from the communications headend 120.

An example of operation, a user of the smart phone 140a may request video services associated with a particular event through the available services 210 in the hosting system 113 of the communications headend 120. In particular, a user may request video clips associated with a Major League Baseball World Series game 7. The user may only wish to receive only video clips each time a run is scored. The user transmits to the user database 225 of the hosting system 112, preferences of video broadcast media of the World Series game 7 and metadata preferences (or conditions) that include search terms corresponding to runs scored in the game. In addition, the user transmits to the user database 225 how notifications should be sent back to the smart phone 140a upon a triggering event based on the metadata preferences; For example, a user may select an option for a short message service (SMS) notification and a link to start playing the video clip.

With the user information now in the user database 225 of the hosting system 113, the search engine 220 in the hosting system 113 searches for the search terms in the non-video portion 930 of the broadcast television signals 910 that the communications headend 120 is receiving (either at the stream level or after it is in the content database). When the particular search terms are identified, the communications headend 120 transmits an appropriate message to the user's device in the notification format requested by the user. In this example, each time a run is scored in the baseball game an SMS message is sent to the smart phone 140a along with a link (e.g., a hyperlink) as to where the clip of the run scored can be viewed. Upon receiving the notification, the user can select the link, connect with the communications headend, and have the communications headend route the video clip to the smart phone 140a to show how the run was scored. Alternatively, the link can be directed to a third-party system from which the video clip can be downloaded or otherwise received.

It is noted that the system and services noted allow for structuring business models that are directly related to a user's preferences. For example, a service can bill for viewing the video upon connecting with the link. Alternatively, a service might provide a "teaser" clip showing the run scored and thereafter ask the user of the smart phone if they want to connect to the game in progress and view the game on their smart phone 140a for a pre-determined fee. Other examples also abound, such as a fee for highlights corresponding to certain triggering time, events, or other associated information.

Figure 8:
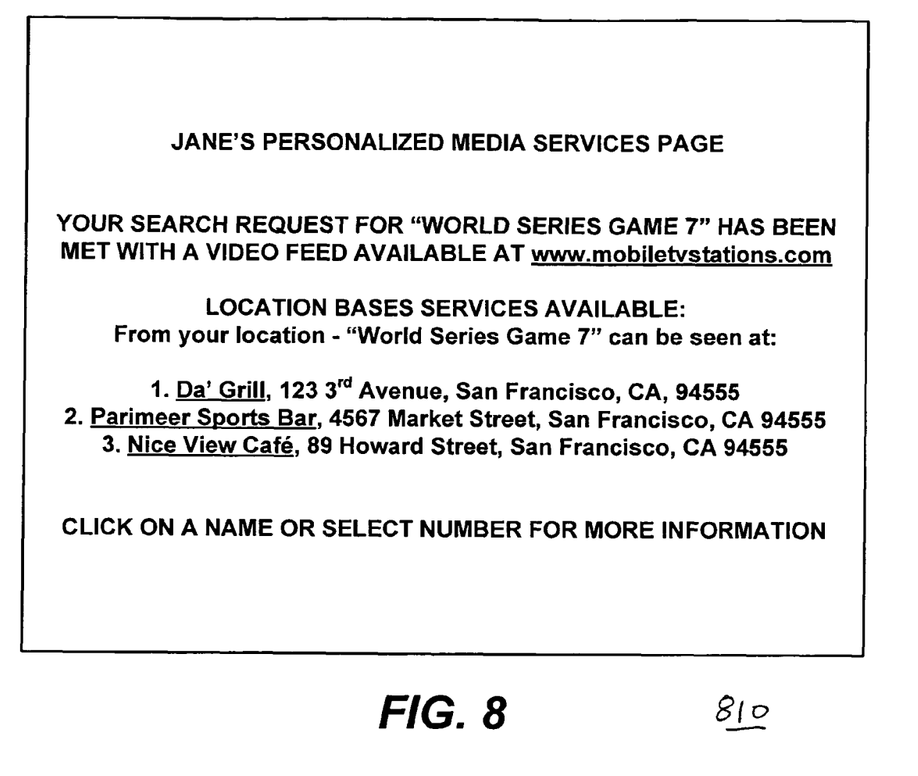
FIG. 8 illustrates a sample screen shot for a client system in accordance with one embodiment of the present invention.

In addition to the service configurations described above, the system can also be configured for add-on, augmented, or complementary services. For example, in addition to receiving a notification corresponding to the search terms requested, other relevant information can be forwarded relating to the metadata preferences. This may include location based services that would note the position of the smart phone, e.g., through a global positioning system, and note points of interest that would correspond to the metadata preferences. For example, FIG. 8 illustrates a sample screen 810 for the case of the World Series game 7 in which a service would transmit the illustrated screen 810 to the smart phone 140a listing locations near where the user presently is located for viewing of the game.

Operational Architecture

Referring now to further details of operational architecture, FIGS. 4 through 7 describe operational processes in the context of broadcast television signals. It is noted, however, the principles disclosed are applicable to other broadcast media signals including, for example, radio, audio broadcast streaming, and video broadcast streaming.

Figure 4:
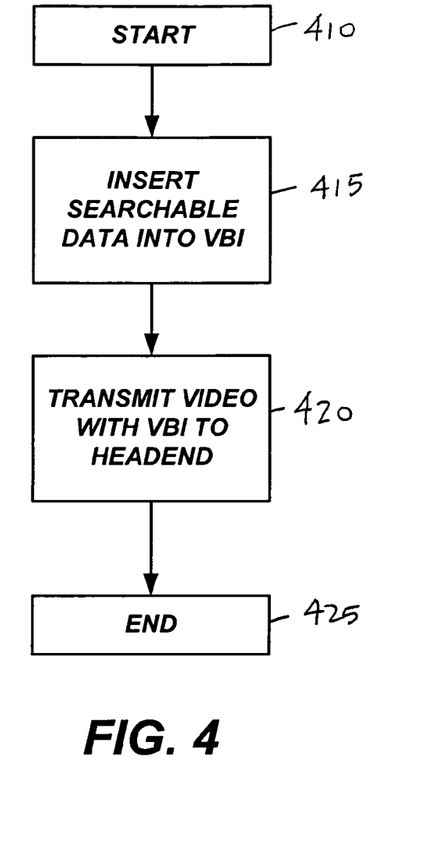
FIG. 4 illustrates a process for inserting metadata into a broadcast television signal in accordance with one embodiment of the present invention.

FIG. 4 illustrates a process for inserting metadata into a broadcast television signal, e.g., 910, in accordance with one embodiment of the present invention. The process starts 410 and inserts 415 data into a non-video portion 930 of the television signal 910. The data entered into the non-video portion 930 should be searchable by a data searching mechanisms.

The entered data may be information about the remainder of the data in the television signal, e.g., the "raw" video data, and thus, can be referenced as metadata. In addition, the data entered should relate to the "raw" video portion 920 of the television signal. For example, in the case of the World Series Game 7 example noted above, the data may include information on being a Game 7 baseball game that is the World Series and/or the teams that are playing. Further, other data can be noted for searching, for example, closed captioning data strings indicating a scored run.

It is noted that for ease of discussion, the non-video 930 portion of the television signal may be referenced as the vertical blanking interval (VBI) for analog-type television signals or video header for in digital-type television signals. With the data entered into the non-video portion 930 of the television signal 910, it is ready for transmission 420 to the communications headend 120 before the process ends 425.

Figure 5:
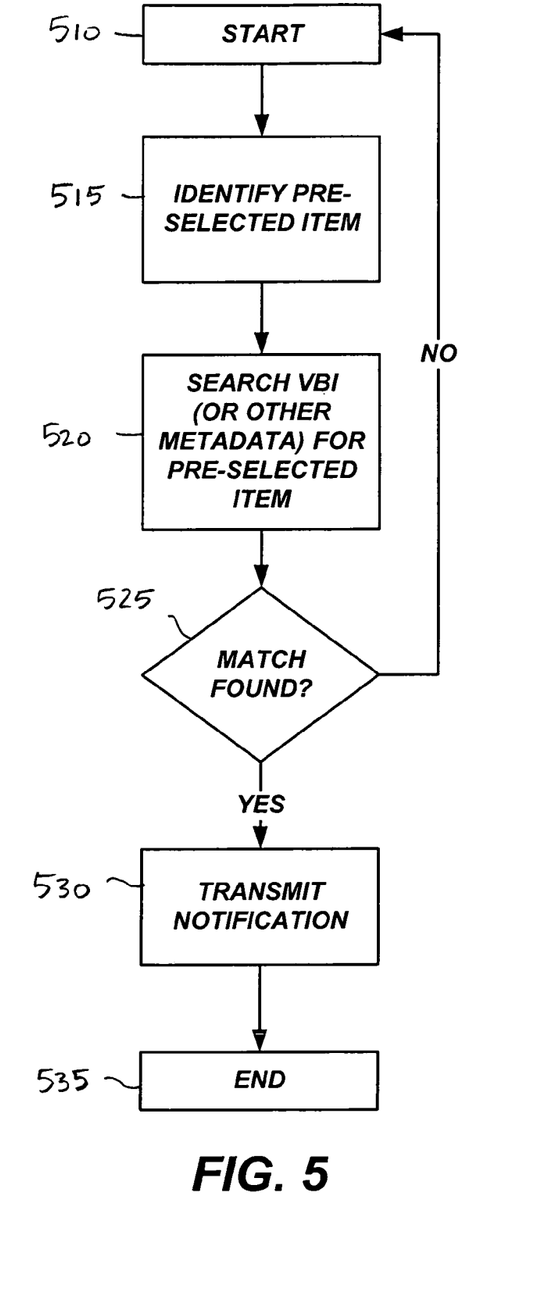
FIG. 5 illustrates a process for comparing metadata in a broadcast television signal with a pre-selected user preference in accordance with one embodiment of the present invention.

The broadcast television signal packed with the appropriate metadata is received by the communications headend 120 and stored in the content database 215. FIG. 5 illustrates a process for comparing metadata in a broadcast television signal with a pre-selected user preference in accordance with one embodiment of the present invention. The process starts 510 with the host system 113 identifying 515 pre-selecting items, or metadata preferences, in the user database 225 as previously provided by a user. The search engine 220 searches 520 the non-video section 930 (e.g., VBI or header) of the broadcast video signal for the specified metadata preferences. The process determines 525 if a match is found. If not, the process can return to start (or alternately may end). If a match is found, the hosting system transmits 530 a notification to the user's bidirectional communication device 140 before the process ends (or prepares to work through again, e.g., standby). The notification sent is in a format as defined by the user and stored in the user database 225.

Figure 6:
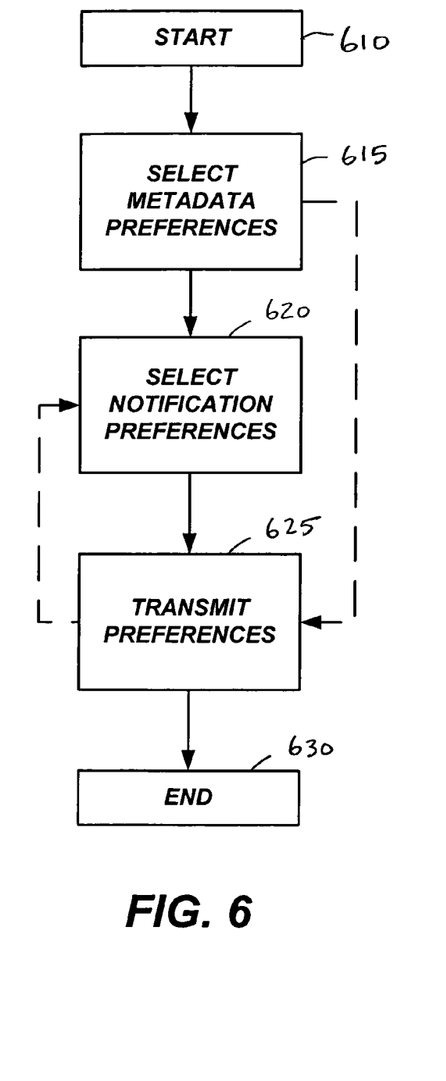
FIG. 6 illustrates a process for configuring a client system to identify metadata and notification preferences in accordance with one embodiment of the present invention.

FIG. 6 illustrates a process for configuring a client system, e.g., the bi-directional communication device 140, to select metadata and notification preferences in accordance with one embodiment of the present invention. As previously described, a user can select preferences that will determine what and how broadcast television signals will be received. Note that references to "live" need not be actual live video, but rather presently available video, which may be actual live television signals or which may be previously scheduled television signals.

The process starts 610 with selection 615 of metadata preferences, for example, search terms or criteria that will be used by the hosting system 113 relative to the broadcast television signal metadata. In addition, there is selection 620 of notification preferences. The notification preferences can be any notification service, for example, short message service (SMS), multimedia message service (MMS), electronic mail (e-mail), rich site summary (RSS), or a live or scheduled broadcast feed. The metadata and notification preferences are transmitted 625 to the hosting system 113, which stores them with other user information, e.g., unique identifier, in the user database 225. It is noted that the metadata and notification preferences can be selected and transmitted in any order.

Once the hosting system 113 in the communication headend 120 identifies a match between the user's metadata preferences (or conditions (e.g., selected or entered preferences)) and metadata in the broadcast television signal, the user is notified of the television signal through the previously configured notification mechanism. When the user is notified on the bi-directional communication device, the resulting notification may allow for execution of additional features or functions.

Figure 7:
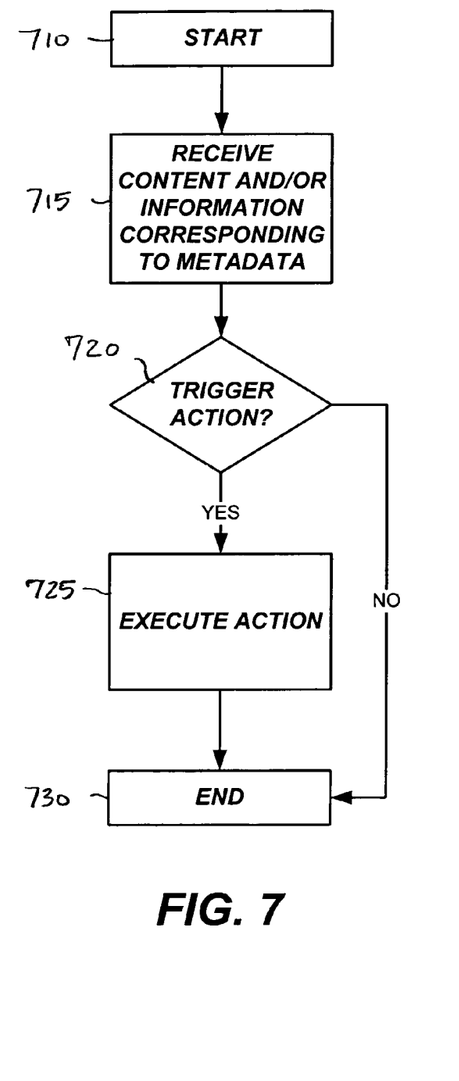
FIG. 7 illustrates a process for further action by a client system in response to receipt of content and/or information corresponding to the metadata in accordance with the present invention.

FIG. 7 illustrates a process for further action by a client system, e.g., the bi-directional communication device 140, in response to receipt of content and/or information corresponding to the metadata in accordance with the present invention. The process starts 710 and receives 715 information (e.g., a link to the live television signal content) and/or the live television signal content which corresponds to the pre-identified (or pre-selected) by the user. Based on the response received from the hosting system 113 from the bi-directional communication device 140 the process determines 720 whether a particular action should be triggered (or executed). If the process determines 720 no action is to be triggered, the process can end 730. Alternatively, if the process determines 720 that an action is to be triggered, it launches or executes 725 the action.

By way of example, the notification may include a link for the "live" television signal feed, which can launch automatically based on user preferences set in the bi-directional communication device 140. Further by way of example, the notification mechanism can be used to trigger activities such as recording of the live television signal. In devices such as smart phones, the live video signal can be recorded locally or alternatively, can be used to communicate with a third device that will record the program, e.g., the smart phone can call or email a digital video recorder at home to record the television signal it was just notified about. In another example, the notification may trigger additional service, for example, location based services as described previously.

System Configurations

With respect to the processes described herein, the order in which steps are performed by or within the communications system 105, e.g., broadcast transmission system 110, communications headend 120, and/or one or more bi-directional communication devices 140, is purely illustrative in nature. The steps can be performed in any order or in parallel, unless otherwise indicated by the present disclosure.

The processes may be performed in hardware, firmware, software, or any combination thereof operating on a single computer or multiple computers of any type. Software embodying the processes may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

Some portions of the detailed description are presented in terms of algorithms and symbolic representations of operations on data bits within a computer memory. These algorithmic descriptions and representations are means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, e.g., for reasons of common usage, to refer to these signals as bits, values, elements, symbols, characters, terms, numbers, or the like.

It is noted, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed also relate to an apparatus for performing the operations herein. The apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, although the descriptions herein are not described with reference to any particular programming language. a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

Structural and Operational Advantages

A system and a method configured in view of the principles disclosed herein beneficially provides users with a unique paradigm for customization involving interaction with broadcast media signals. Moreover, the disclosed configurations illustrate how broadcast media signals, for example, live television signals, are more readily available on portable devices, for example, smart phone and other portable bi-directional communication devices. Moreover, the user receives only the information considered of relevance to the user through a pre-selection and matching process and is made available to the user for viewing presently or in the future. In addition, the information fed to the user also can trigger additional functionality or services relating to pre-selected user preferences.

It is noted that the future viewing can be configured for storage and handling at a server or locally (e.g., on a media), for example, for offline (or later) viewing. For example, a user may be notified about live content on their mobile device. In addition, the viewer can be given an opportunity to view it later. If the user elects to view it later, the user may be shown an interface that allows the user to "record" the program (e.g., broadcast television program). The program gets recorded and stored at a server in the headend or locally on the device (e.g., mobile digital video recorder (DVR)). Thereafter, the user may download to view in a "streaming" manner or may download the entire video for later viewing, e.g., on an airplane. This configuration may also allow for business modeling in which fees can be charged to the appropriate device or user (whichever is registered in the user database) for each recorded program.

Upon reading this disclosure, those of skill in the art will appreciate still additional alternative structural and functional designs for a system and a process for enhancing a user experience (e.g., through personalization services) relative to a broadcast media through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of configuring a mobile computing device for providing personalized event occurrence notification, the method comprising:
    selecting a metadata preference associated with the occurrence of an event for use in a search of metadata incorporated in media signals;
    selecting a notification preference for a notification format;
    transmitting the selected metadata preference to a hosting system;
    transmitting the selected notification preference to the hosting system;
    receiving, in the notification format, data corresponding to one of the media signals, said media signal incorporating metadata indicating the occurrence of the event corresponding to the metadata preference;
    transmitting to the hosting system, responsive to receiving the data, a location of the mobile computing device determined by a positioning device;
    receiving information about a point of interest geographically proximate to the location of the mobile computing device, said media signal available for viewing at the point of interest; and
    displaying information about the occurrence of the event along with information about said media signal and the point of interest.

2. The method of claim 1, further comprising:
    determining whether to launch an application associated with the received data; and
    executing the application in response to receiving an execution signal.

3. The method of claim 1, wherein the media signals comprise a television signal.

4. The method of claim 1, wherein said media signal is played in the point of interest, and wherein the positioning device comprises a global positioning system.

5. The method of claim 3, wherein the television signal comprises a digital television signal or an analog television signal.

6. The method of claim 5, wherein the digital television signal includes a raw video stream and a user data field.

7. The method of claim 6, wherein the metadata is stored in the user data field.

8. The method of claim 1, wherein the metadata preference comprises an event notification and wherein the notification format is one of an electronic mail and a text message.

9. The method of claim 1, wherein the notification format is one of a short message service (SMS) message and a multimedia message service (MMS) message.

10. The method of claim 1, wherein the media signals comprise a streaming signal.

11. A non-transient computer readable medium encoded with a computer program, the computer program when executed by a processor performs steps comprising:
    selecting a metadata preference associated with the occurrence of an event for use in a search of metadata incorporated in media signals;
    selecting a notification preference for a notification format;
    transmitting the selected metadata preference to a hosting system;
    transmitting the selected notification preference to the hosting system;
    receiving, in the notification format, data corresponding to one of the media signals, said media signal incorporating metadata indicating the occurrence of the event corresponding to the metadata preference;
    transmitting, responsive to receiving the data, a location of the mobile computing device determined by a positioning device to the hosting system;
    receiving information about identifying a point of interest geographically proximate to a the location of the mobile computing device, said media signal available for viewing at the point of interest;
    and displaying information about the occurrence of the event along with information about said media signal and the point of interest.

12. The non-transient computer readable medium of claim 11, wherein the notification format is one of an electronic mail, a text message, a short message service (SMS) message, and a multimedia message service (MMS) message.

13. The non-transient computer readable medium of claim 11, wherein said media signal comprises a television signal that is played in the point of interest, and wherein the positioning device comprises a global positioning system.

14. The non-transient computer readable medium of claim 11, wherein selecting the metadata preference further comprises selecting the event.

15. The non-transient computer readable medium of claim 11, wherein the steps further comprise executing an application in response to receiving the data in the notification format.

16. A mobile computing device comprising:
- a data input mechanism adapted to receive a selection corresponding to a metadata preference associated with the occurrence of an event for use in a search of metadata incorporated in media signals and to receive a selection corresponding to a notification preference for a notification format;
- a transmitter adapted to transmit the selected metadata preference to a hosting system and to transmit the selected notification preference to the hosting system;
- a receiver adapted to receive, in the notification format, data corresponding to one of the media signals, said media signal incorporating metadata indicating the occurrence of the event corresponding to the metadata preference;
- wherein the transmitter is further adapted to transmit, responsive to receiving the data, a location of the mobile computing device determined by a positioning device to the hosting system, and wherein the receiver is further adapted to receive information about a point of interest geographically proximate to the location of the mobile computing device, said media signal available for viewing at the point of interest; and
- a displaying mechanism adapted to display information about the occurrence of the event along with information about said media signal and the point of interest.

17. The mobile computing device of claim 16, wherein the processor is farther adapted to determine whether to launch an application associated with the received data and to execute the application in response to receiving an execution signal.

18. The mobile computing device of claim 16, wherein the media signals comprise a television signal.

19. The mobile computing device of claim 16, wherein said media signal comprises a television signal that is played in the point of interest, and wherein the positioning device comprises a global positioning system.

20. The mobile computing device of claim 16, wherein the notification format is one of a short message service (SMS) message and a multimedia message service (MMS) message.

* * * * *

UNITED STATES PATENT AND TRADEMARK OFFICE
CERTIFICATE OF CORRECTION

PATENT NO.         : 7,743,396 B2                                    Page 1 of 1
APPLICATION NO.    : 11/316585
DATED              : June 22, 2010
INVENTOR(S)        : Matthew W. Crowley et al.

It is certified that error appears in the above-identified patent and that said Letters Patent is hereby corrected as shown below:

Column 12, line 48, after "proximate to", delete "a".

Signed and Sealed this

Second Day of November, 2010

David J. Kappos
*Director of the United States Patent and Trademark Office*